INVENTOR
NORMAN R. KRAUSE
By
Wheeler, Wheeler & Wheeler
ATTORNEYS

United States Patent Office 3,314,412
Patented Apr. 18, 1967

3,314,412
HUMIDIFIER
Norman R. Krause, 3710 Wright Ave.,
Racine, Wis. 53405
Filed Oct. 23, 1965, Ser. No. 503,768
6 Claims. (Cl. 126—113)

This invention relates to a humidifier. It will function with any source of heat but is desirably associated with a heating plant such as a furnace so that the amount of water evaporated is generally proportioned to the need resulting from the extent to which the air in the living quarters is heated.

It is the object of the invention to provide a humidifier particularly designed for association with a furnace and adapted by simple, inexpensive means to function automatically and dependably without requiring electrical connections and without requiring controls of a type which are subject to sticking in use.

In the preferred installation disclosed, at least a portion of the air traversing the furnace is heated therein and passes over a succession of pans in a stack which are filled from the top and to which the water supply is controlled by a float subject to the level of the water in the lowermost pan in the series. These pans are preferably offset alternately in opposite directions for forth and back flow of air. While the float is subject to the water in the lowermost pan, the valve controlled thereby discharges directly and without back pressure into the uppermost pan of the stack, thus eliminating packing valves such as might be required if the valve were on the level of the float.

The water in the lowermost pan is heated, preferably by a coil disposed either in the combustion chamber or the flue of the furnace, the arrangement being such that the water recirculates in the lowermost pan when heated, thereby differentially promoting evaporation from the lowermost pan and making the float sensitively responsive. Accuracy of float response is further achieved by the fact that the float is nearly equal in cross section to the float chamber and by the further fact that the connection between the float chamber and the pan is preferably effected in the return line of the circulatory system in which the water is heated.

Figure 1:
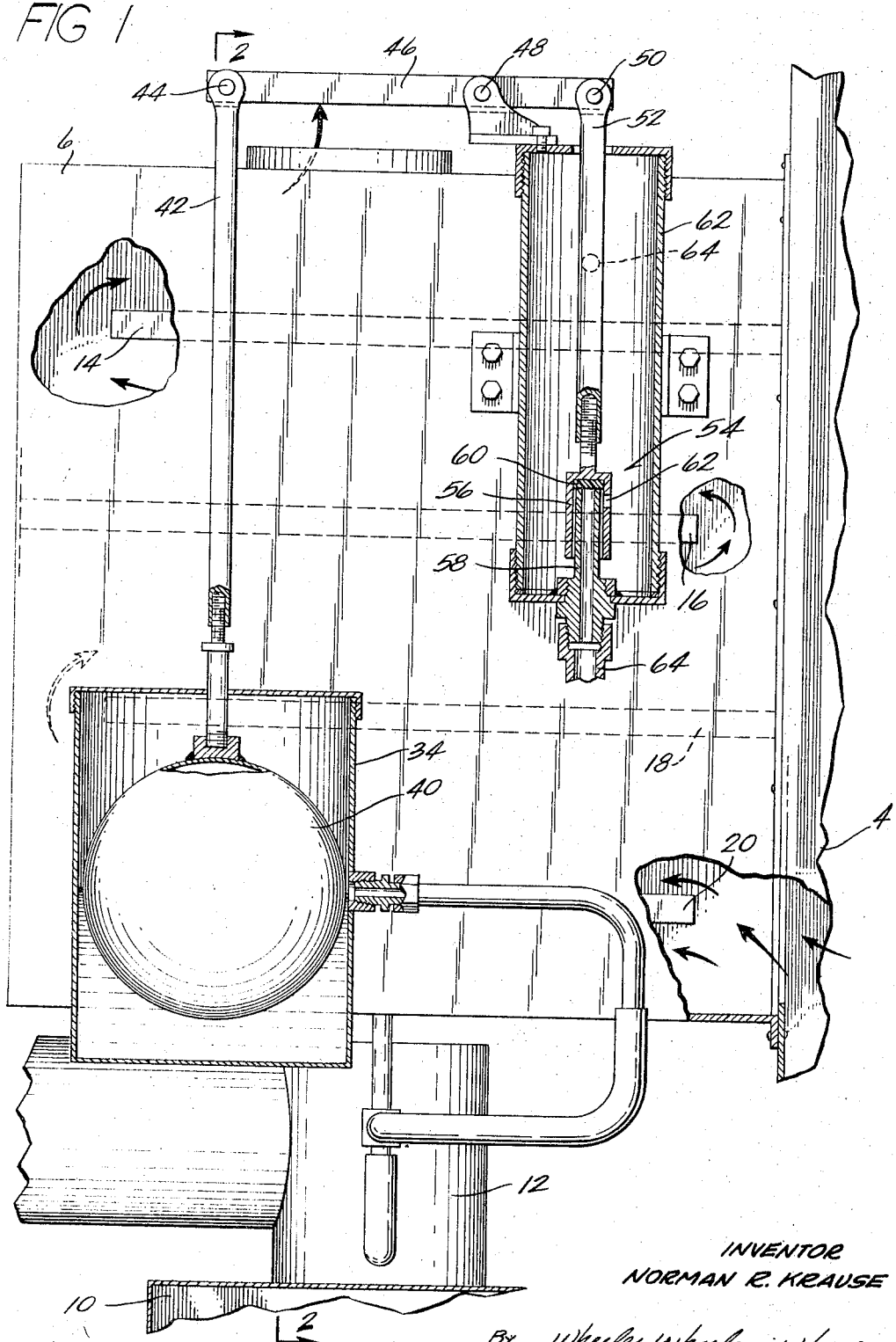
FIG. 1 is a view in side elevation fragmentarily illustrating portions of a heating plant to which the humidifier embodying the invention has been applied, portions being broken away.
Figure 2:
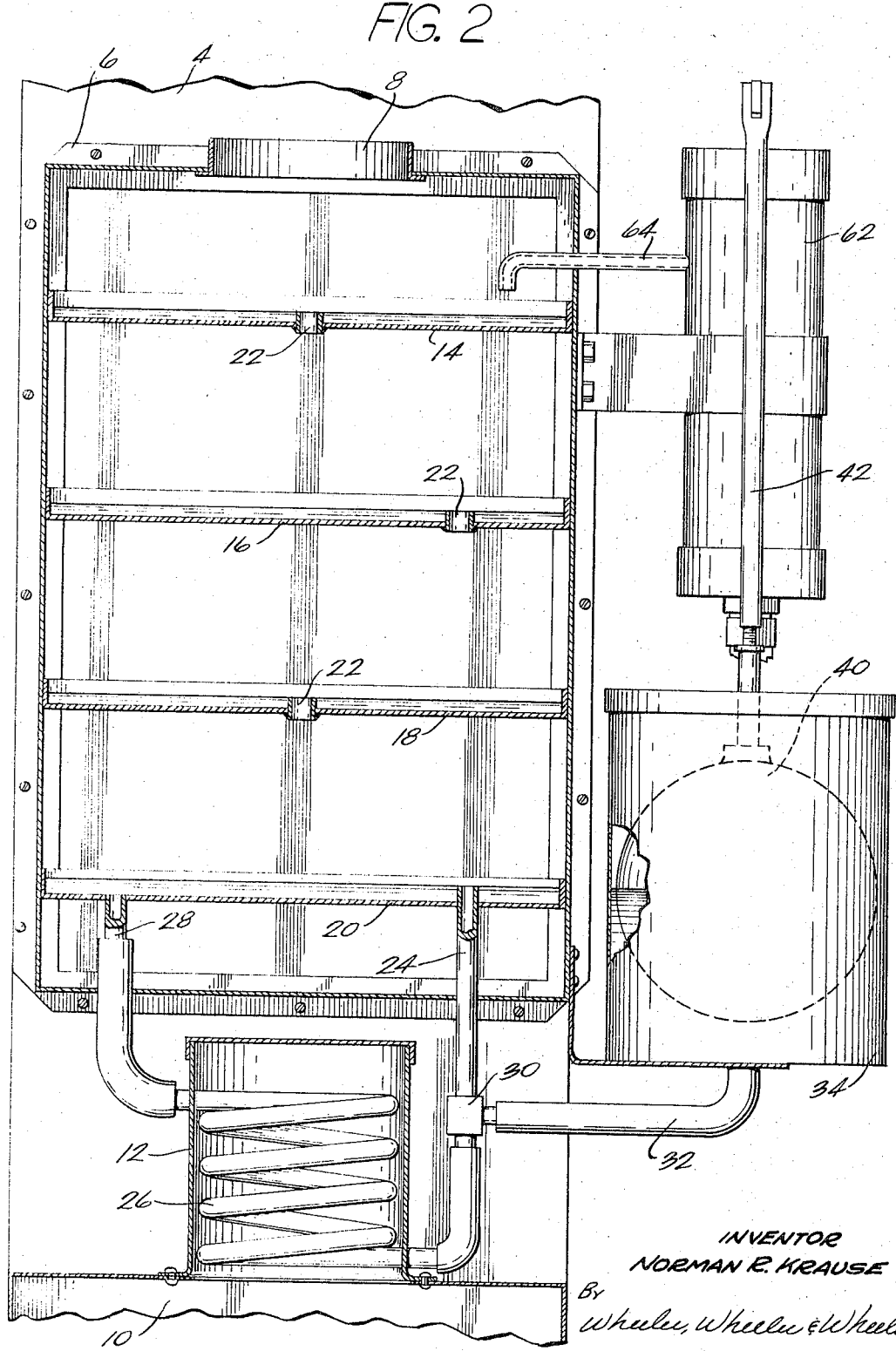
FIG. 2 is a diagrammatic view taken in section on line 2—2 of FIG. 1, portions being broken away.

It will be understood that the installation to be described is but one of the many possibilities in this regard. A furnace plenum is diagrammatically shown fragmentarily at 4. To it is attached, preferably externally, a humidifier vaporizing compartment 6. The humidified air may be returned to the plenum or may pass directly to a room outlet for which a coupling is provided at 8 (FIG. 2).

The heating plant is assumed to have some sort of exhaust gas chamber 10 from which leads a flue 12.

In the vaporizing compartment 6 is a stack of pans 14, 16, 18 and 20 with provisions such that water introduced into any of the upper pans, in excess of a predetermined level, will flow into the next succeeding lower pan, ultimately arriving at pan 20 at the bottom of the stack. Any desired number of pans may be used. In the instant device, for example, each of pans 14, 16 and 18 has a nipple 22 projecting slightly above the bottom of the pan and defining the desired level. Any excess of water delivered into the pan over the level defined by the top of the nipple will flow through the nipple into the next lower pan.

The bottom pan 20 has a circulatory heating system including a pipe 24 connected with a coil 26 in the flue pipe 12. The other end of the coil has a return pipe 28 leading back into the pan 20. When the heating plant is in operation, the heat delivered by the flue gas to coil 26 brings about a circulation of water from and to pan 20. The heat promotes evaporation from pan 20, thus giving preferential evaporation from this pan as compared with the other pans in the stack. This compensates for any possible tendency that flow from the superimposed pans of the stack will tend to overload pan 20. It is also significant that it is the level of water in this lowest pan 20 that controls the supply of additional water to the whole stack of pans.

A $t$ 30 in the circulatory system, and preferably on the "cold" down flowing pipe 24, connects to conduit 32 with the float chamber 34. Any circulatory movement of water through the system tends to aspirate water from the flow chamber 34, thus effecting prompt response as soon as evaporation is initiated from the heated water in pan 20.

The float 40 is preferably designed to fit closely to the cross section of chamber 34. There is desirably enough clearance so the float movement will be unimpeded by friction. However, the clearance is so slight that the addition or removal of a very small amount of water will change the level in the float chamber to bring about upward or downward movement of the float 40.

The float 40 has a stem 42 pivotally connected at 44 with a lever 46 for which a fulcrum is provided at 48. This lever is pivotally connected at 50 with the stem 52 of a valve 54 which is preferably of special design.

In the preferred embodiment of the invention, valve 54 comprises an inverted cup having a marginal flange portion 56 guided on the water supply pipe 58. The valve closure is effected by means of a valve disk 60 which may conveniently be made of sheet rubber fitted into or cemented or otherwise fastened into the inverted cup-shaped member 54. Openings at 62 in the side walls 56 of the cup-shaped member permit flow of water outwardly from the cup-shaped member into the valve chamber 62 when the valve is open. From valve member 62, water is delivered by gravity to the inlet pipe 64 to the uppermost tray 14 in the stack of trays in the vaporizer compartment 6.

It will be observed that because valve chamber 62 is at the level of the tray to which the water is to be delivered, there is no need for any packing of the valve stem. Consequently, there is nothing to impede perfectly free axial movement of the valve stem, which is guided solely by its pivotal connection at 50 and its separate and loosely sleeved water-lubricated bearing on supply pipe 58 at its lower end.

Because of the virtually frictionless operation of the device as herein disclosed, and its very sensitive response, it is well adapted for home installations and can be supplied at modest price and without repairing electric equipment or any installation such as a furnace man cannot readily handle.

I claim:
1. In a humidifier, the combination with a humidifying pan, of a float chamber communicating with the pan, and means for replacing in the pan water evaporated therefrom, said means including a float in the float chamber, a valve having a stem operatively connected mechanically with the float, a water supply pipe controlled by the valve, a valve chamber into which water from the supply pipe enters when the valve is open, and means for the gravity delivery of water from said chamber to said pan, the valve stem connection being above water level in the valve chamber and hence being free of packing, said pan being provided with a water circulating and heating system including a heat absorbing coil adapted to be mounted in a position where it will be exposed to temperature of the flue gas in the heating plant.

2. In a humidifier, the combination with a humidifying pan, of a float chamber communicating with the pan, and means for replacing in the pan water evaporated therefrom, said means including a float in the float chamber, a valve having a stem operatively connected mechanically with the float, a water supply pipe controlled by the valve, a valve chamber into which water from the supply pipe enters when the valve is open, and means for the gravity delivery of water from said chamber to said pan, the valve stem connection being above water level in the valve chamber and hence being free of packing, said pan being provided with a water circulating and heating system including a heat absorbing coil adapted to be mounted in a position where it will be exposed to temperature of the flue gas in the heating plant, the float chamber having its connection with said pan effected through a portion of said circulatory system.

3. In a humidifier for installation in connection with a home heating plant having a plenum and a flue pipe, the humidifier comprising the vaporizing compartment communicating with the plenum, a coil exposed to the heated gas in the flue pipe, a vertical stack of pans in the vaporizer compartment each of which above the lowermost has means defining a predetermined level and means for delivering into the next successively lower pan water exceeding such level, a water circulating system including supply and return pipe connections between the lowermost pan of said stack and the aforesaid coil, a float chamber having means placing it in communication with said pan to receive water therefrom, a float in the float chamber at a level determined by the level of water therein, said float having a cross section substantially filling the cross section of the float chamber, a valve casing at a level materially higher than that of the float, a water supply pipe leading into the valve chamber, a valve operatively associated with said pipe to control flow of water into the valve chamber from the pipe, linkage operatively connecting the float with the valve for opening and closing the valve when the level of water in the float chamber falls and rises, and a delivery pipe from the valve chamber to the uppermost stack in the series, said linkage extending above the level of water in the valve chamber whereby to require no packing.

4. A humidifier according to claim 3 in which the valve comprises an inverted cup having side wall portions guided on the water supply pipe and having a valve disk for seating against the end of the supply pipe, said cup having a valve stem constituting a part of said linkage.

5. In a humidifier, the combination with a vertical stack of pans each of which above the lowermost has means for defining a predetermined level, of means are delivering into the next successive lower pan water exceeding such level, means for preferentially accelerating evaporation from the lowermost pan, said means comprising a heating coil and a circulatory system with which said heating coil is in series, said system communicating with the lowermost pan and a flue gas pipe in which the coil is disposed and which comprises means for heating said coil.

6. A humidifier according to claim 5 in further combination with means for supplying water to an upper pan in the stack, said means including a water supply line leading to said upper pan, a float valve controlling flow through said line, and a float chamber in which the float is located and which communicates with a pan below the pan to which the water is delivered.

References Cited by the Examiner
UNITED STATES PATENTS

| | | | |
|---|---|---|---|
| 95,734 | 10/1869 | Schopp | 126—113 |
| 1,418,296 | 6/1922 | Gohmann. | |
| 1,515,490 | 11/1924 | Jordan | 126—113 |
| 2,806,466 | 9/1957 | Thompson | 126—113 |
| 3,209,744 | 10/1965 | Ayres et al. | 126—113 |

JAMES W. WESTHAVER, *Primary Examiner.*